Dec. 19, 1967 C. S. SCANLEY 3,359,073
APPARATUS FOR DISSOLVING POLYMER PARTICLES
Original Filed Oct. 13, 1964
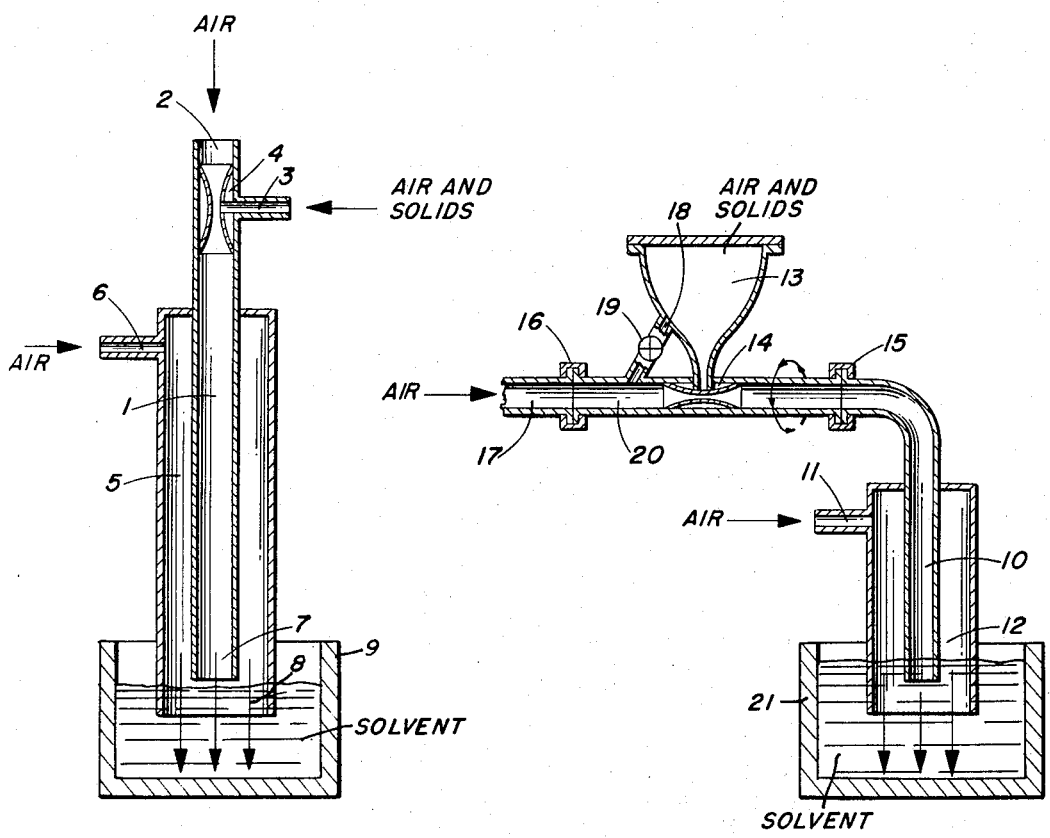
INVENTOR.
CLYDE S. SCANLEY
BY Frank M. Van Riet
ATTORNEY

3,359,073
APPARATUS FOR DISSOLVING POLYMER PARTICLES
Clyde Stephen Scanley, Stamford, Conn., assignor to American Cyanamid Company, Stamford, Conn., a corporation of Maine
Original application Oct. 13, 1964, Ser. No. 403,543. Divided and this application Oct. 28, 1966, Ser. No. 590,420
1 Claim. (Cl. 23—269)

ABSTRACT OF THE DISCLOSURE

An apparatus for the dissolution of dry, finely-divided, solid polymer particles having a size ranging from about 0.002 millimeter to about 3.0 millimeters which comprises a central conduit open at both ends, a venturi restriction at one end thereof, a solid and gas inlet conduit opening directly into said venturi restriction, a sleeve encasing and axially aligned with a substantial portion of the end of said central conduit opposite said venturi restriction, one end of said sleeve being closed and permanently attached to said central conduit and the other end of said sleeve extending past said end opposite said venturi restriction, a tank for holding solvent situated about the open end of said sleeve and a gas inlet in said sleeve is described.

---

This application is a division of my copending application, Ser. No. 403,543, filed Oct. 13, 1964, now abandoned.

Various methods have been previously devised for dissolving dry polymers in solvents in order to produce a solution thereof. Specifically, it has been found that polymer particles have a tendency to dissolve relatively slowly when they are of a large size. In order to obviate this slow dissolving tendency, it has been the general practice to grind the polymer particles into a finely granulated state and then contact them with a solvent. Such a method enables the polymer granulars to dissolve much faster than the larger particles. The use of small particles, however, tends to cause the agglomeration of these particles into large clumps or masses when contact with the solvent is initiated since the solvent produces a sticky surface to which other particles adhere. I have now found a novel process whereby finely-divided, powdery polymers can be dissolved in solvents at a rapid rate and with decreased agglomeration. Furthermore, I have found a novel apparatus which may be utilized to effect such a dissolution of powdery polymers.

It is therefore the object of the present invention to provide a novel process for dissolving dry, finely-divided polymer particles.

It is a further object of the present invention to provide a process for dissolving dry, finely-divided polymer particles which tend to agglomerate and form viscous solutions upon contact with solvents which comprises blowing said particles, sub-surface to a solvent therefor, in a stream of gas having a speed of at least about five feet per second.

It is a further object of the present invention to provide novel apparatus which is particularly adaptable to the above-mentioned method of dissolving powdery polymer particles.

These and other objects will become more apparent to one skilled in the art upon reading the more detailed description of the present invention set forth hereinbelow.

According to the instant process, dried polymer particles which are of a fine or powdery consistency can be dissolved in a solvent by blowing the powder sub-surface to the solvent as a mixture with gas at a certain air speed.

This process can be applied to any solid which is difficultly solubilized, but is, in particular, designed for the solubilization of powdery particles of polymers which tend to agglomerate and form viscous solutions when contacted with liquid solvents. In other words, preferably any homopolymerized or copolymerized material which is in powdery form and tends to agglomerate and form viscous solutions when contacted with solvents can be utilized as charge materials in the instant process.

Examples of monomers which may be utilized as homopolymers or as copolymers with one another include the acrylamides such as acrylamide, methacrylamide, the dialkylaminoalkyl acrylamides, such as dimethylaminoethyl acrylamide and methacrylamide, the acrylic acids such as acrylic acid and methacrylic acid, various dialkylaminoalkyl acrylates, such as dimethylaminoethyl acrylate, dimethylaminoethyl methacrylate, vinyl pyridine, methyl vinyl pyridine, vinyl pyrrolidone, various amino styrenes such as p-dimethylaminomethyl styrene, compounds such as vinyl sulfuric acid, diallyl dimethyl ammonium chloride, trimethyl ammonium ethyl acrylate (chloride) and the like.

The molecular weight of polymers which are to be utilized in the present invention should be at least about 100,000, in that at lower molecular weights the viscosity of the polymer in the solution is not sufficiently high to cause difficulty in solubilization when contacted with a solvent. The higher molecular weight of other polymers generally causes them to be very viscous in solution and, as such, when the polymer is contacted with a solvent, the high molecular weight tends to increase the tendency of the powdery particles to agglomerate into spongy or very sticky masses, the dissolution of which is very slow.

The process of the present invention may be carried out at any temperature, however, it is preferred that room temperature be employed since higher or lower temperatures generally affect the characteristics of the solvent employed. Atmospheric pressure is also preferably employed, however, superatmospheric or subatmospheric may also be utilized.

As mentioned above, generally polymers or other solid materials of any particle size may be employed, but excellent results are obtained using charge materials having a particle size ranging from about 0.002 millimeter to about 3.0 millimeters and preferably 0.05–2.0 millimeters. I have found that particles of polymer having diameters in this range result in optimum dissolution in regard to the quantity of material dissolved and the time which elapses during said dissolution.

The process is conducted by blowing a mixture of the solid particles and a gas into a solvent for the solid particles at a point below the surface thereof. More particularly, the particles are carried along by the stream of gas and blown into the solvent at a point sub-surface thereto in a gas stream having a speed of at least three feet per second. I have found that air speeds below three feet per second are insufficient to disperse the solid material in that as speeds drop below this rate there is progressively more tendency for the particles to agglomerate in solution and to clog the outlet of the apparatus being used.

Any inert gas, i.e., one which will not react with the solid particles or the solvent into which they are being blown, may be used in the process of the present invention with such gases as nitrogen, carbon dioxide, carbon monoxide, normally gaseous hydrocarbons such as butane, pentane, hexane etc., air, oxygen, argon, neon and the like being exemplary. For practical purposes, of course, air is generally used because of its availability.

The process of the present invention will be more apparent to one skilled in the art by reference to the figures of the drawings wherein:

FIGURE 1 depicts an apparatus for the blowing of an air stream carrying solid powdery particles into a liquid; and FIGURE 2 shows modification of the same apparatus wherein a specific means of injecting the solid material into the air stream is particularly set forth.

My novel apparatus is composed of a central conduit, preferably of cylindrical configuration, which has a venturi restriction in one end thereof. The conduit is open at both ends and has positioned therein an inlet conduit which admits a solid and gas mixture to the central conduit. The interior of the central conduit is preferably rifled with a continuous spiraling fin the entire length thereof which causes the solids and gas which are blown therethrough to twist, much in the same manner as a rifle bullet, thereby causing a greater mixing action when the solids contact the solvent. The inlet conduit is positioned so that the interior end thereof terminates at the venturi restriction in the central conduit. The section of the central conduit opposite the venturi is encased in a sleeve which is axially aligned with and permanently affixed to the central conduit at the upper end thereof below the venturi and is open at the lower end. The sleeve is also preferably cylindrical in shape and must extend past the lower open end of the central conduit. Positioned in the sleeve is a gas inlet somewhat above the lower open end of the central conduit.

In a modification of my novel apparatus, the upper end of the central conduit has permanently attached thereto a hopper which is preferably funnel-shaped and terminates at its narrow end at the venturi restriction. The hopper is utilized to pass solids and gas into the central conduit at the venturi. The central conduit, in this modification, is fitted with two friction bearings, one on each side of the venturi. These bearings are air-tight but are of such design that the section of the central casing which contains the venturi and to which is attached the hopper can rotate axially in an entire 360° circle. A gas conduit is positioned in the central conduit, between the forward bearing and the hopper, and runs from said central conduit to the hopper. The gas conduit has positioned therein a gas valve which regulates the flow of gas from the central conduit to the hopper.

The process and function of the apparatus, by reference to the drawing, will be described hereinbelow in detail in connection with the dissolution of polyacrylamide in water, but it is stressed, as hereinbefore mentioned and hereinafter provided in the specification and claim by actual working examples, that other solid materials, and, in particular, polymers, may be employed utilizing various liquid solvents, in addition to water.

Referring to FIGURE 1, air is introduced into central conduit 1 at point 2 while at the same time a second stream of air is directed through gas inlet 6 into sleeve 5 and out the lower end thereof at point 8. Sleeve 5 is preferably cylindrical in cross-section and completely encases central conduit 1 while extending beyond lower open end 7 thereof. With both air streams in operation, air is admitted to central conduit 1 via inlet conduit 3 directly into venturi restriction 4. The apparatus is then plunged into the water contained in vessel 9 and the polyacrylamide is admitted through inlet conduit 3 and blown subsurface into the water with such force that clumping and agglomeration thereof is minimized. Sleeve 5 extends beyond the extreme end of conduit 1 (the lower open end) in order to prevent the build-up of a polyacrylamide mass at point 7 by contact of powder with water thereby plugging the apparatus. The air admitted through gas inlet 6 and passing into the water at point 8 prevents the water from contacting the polyacrylamide particles at point 7 and therefore prevents the plugging of the apparatus with a wetted particle build-up. The rifling (not shown) in central conduit 3 causes the polyacrylamide to contact the water with a twisting motion thereby resulting in more complete and rapid dissolution.

FIGURE 2 depicts a modification of the apparatus wherein polyacrylamide particles are placed in hopper 13 and fed into the water, as described above. Air is admitted into central conduit 10 at point 17 and a second stream of air is admitted to sleeve 12 via gas inlet 11. Central conduit 10 is composed of three sections, the outer two being separated by rotatable friction bearings 15 and 16, and the inner portion being hopper section 20. At the outset, the hopper section 20 is rotated and positioned so that the polyacrylamide falls away, by gravity, from the entrance to venturi 14. After the air streams are started, the hopper section 20 is rotated to allow the polyacrylamide to be pulled, by gravity, downwardly into venturi restriction 14, after placing the end of central conduit 10 and sleeve 12 into the water contained in vessel 21. Valve 19 is then opened and air is admitted into the hopper via conduit 18 to further increase the injection of polyacrylamide into the stream of air passing through venturi 14 and central conduit 10 into the water. By merely rotating hopper section 20 so that the polyacrylamide in hopper 13 falls away from venturi section 14, injection of the solid polyacrylamide into the solvent is terminated.

The procedure of this invention is, as mentioned above, employed with particular advantage in the dissolution of polymers which tend to form extremely viscous or gel-like solutions and are of such particle size that they tend to agglomerate and form relatively unusable polymeric masses which are difficult if not impossible to recover. Any well-known solvent for any particular polymer may be employed in the instant procedure, the particular solvent used in each instance being, of course, dependent upon the polymer being dissolved.

In order that the concept of the present invention may be more completely understood the following examples are set forth by way of illustration only. These examples are not intended as limitations on the instant process except as set forth in the appended claims.

All parts and percentages are by weight unless otherwise specified.

*Example 1 (Comparative)*

100 parts of polyacrylamide, having a molecular weight of 5,000,000, are micropulverized into a fine powder, 90% of which has a particle size ranging from about 0.01 to about 0.4 millimeter. The resulting powder is added slowly over a period of about 10 minutes and with vigorous agitation to a suitable vessel containing 500 parts of water at room temperature. The polymer particles form into large spongy masses, the largest of which dissolves in about 3 hours and the smallest of which dissolves in 2 hours.

*Example 2*

100 parts of polyacrylamide, having a molecular weight of 5,000,000, are micropulverized to produce a fine powder, 90% of which has particle size ranging from about 0.01 to about 0.4 millimeter. The resulting powdery polymer is blown at room temperature into a vessel containing 500 parts of water, below the surface thereof, in a stream of air having a speed of about 12 feet per second over a period of about 5 minutes. The polymer particles do not agglomerate and the entire amount of polymer is completely dissolved in about 20 minutes.

Following the procedures of Examples 1 and 2, various other powdery polymers are dissolved in solvents according to the procedure of the prior art and the procedure of the instant invention. The results are set forth below in Table I.

TABLE I

| Ex. | Material | Molecular Weight | Solvent | Dissolving Time,[1] Min. | | Particle size, Millimeters | Gas Speed, Ft./Sec. |
|---|---|---|---|---|---|---|---|
| | | | | As per Ex. No. 1 | As per Ex. No. 2 | | |
| 3 | Sodium polyacrylate | 1,000,000 | $H_2O$ | 30 | 4 | 0.002–0.01 (88%) | 25 |
| 4 | Acrylamide-diethylaminoethyl methacrylate copolymer (80:20) | 500,000 | $H_2O$ | 45 | 10 | 0.1–3.0 (98%) | 3 |
| 5 | Sodium polystyrene sulfonate | 800,000 | $H_2O$ | 70 | 10 | 0.01–0.4 (90%) | 10 |
| 6 | Poly(p-dimethylaminomethyl styrene) | 500,000 | $H_2O$ | 50 | 8 | 0.05–1.0 (96%) | [2] 55 |
| 7 | Sodium acrylate-acrylamide copolymer (30:70) | 5,000,000 | $H_2O$ | 30 | 3 | 0.7–3.0 (99%) | 13 |
| 8 | Polyacrylonitrile | 1,000,000 | Dimethylformamide | 90 | 15 | 0.007–0.09 (89%) | 40 |
| 9 | Carboxymethyl cellulose | 300,000 | $H_2O$ | 40 | 5 | 0.05–2.0 (94%) | 60 |
| 10 | Polystrene | 100,000 | Toluene | 70 | 10 | 0.03–1.50 (92%) | [3] 20 |

[1] 100 parts of polymer in 500 parts of solvent.
[2] Nitrogen used.
[3] Carbon dioxide used.

I claim:

An apparatus for the dissolution of dry, finely-divided, solid polymer particles having a size ranging from about 0.002 millimeter to about 3.0 millimeters which comprises a central conduit open at both ends and having a first section, a substantially horizontal second section, and a third section with a substantially vertical leg, means for supplying air to said first section, a venturi restriction in the second section, rotatable friction bearings separating the second section from the first and third sections, a hopper permanently affixed to said second section, a solids conduit opening directly into said venturi restriction from said hopper, a gas conduit passing from the first section end of said second section to said hopper, a valve in said gas conduit, a substantially vertical sleeve encasing and axially aligned with a substantial portion of the vertical leg of said third section, one end of said sleeve being closed and permanently attached to said third section and the other end of said sleeve extending beyond the terminal end of said third section, a tank for holding solvent situated about the open end of said sleeve and of the vertical leg, a second gas inlet in upper portion of said sleeve.

References Cited

UNITED STATES PATENTS

| | | | |
|---|---|---|---|
| 1,454,979 | 5/1923 | Muhlfeld | 302—51 X |
| 2,364,199 | 12/1944 | Derr | 302—36 X |
| 2,683,622 | 7/1954 | Dragon | 23—272.7 |
| 2,737,960 | 3/1956 | Anderson | 23—267 |
| 2,975,000 | 3/1961 | Davis | 302—17 |
| 2,977,196 | 3/1961 | Fleming | 23—308 |
| 3,129,064 | 4/1964 | Harvey | 23—271 X |

FOREIGN PATENTS

| | | |
|---|---|---|
| 300,341 | 11/1928 | Great Britain. |
| 446,708 | 5/1936 | Great Britain. |

NORMAN YUDKOFF, *Primary Examiner.*

S. J. EMERY, *Assistant Examiner.*